No. 673,206. Patented Apr. 30, 1901.
E. P. L. HARDY.
GRAVITATION OR GIGANTIC WHEEL FOR RECREATION PURPOSES.
(Application filed Dec. 12, 1899.)
(No Model.) 6 Sheets—Sheet 2.
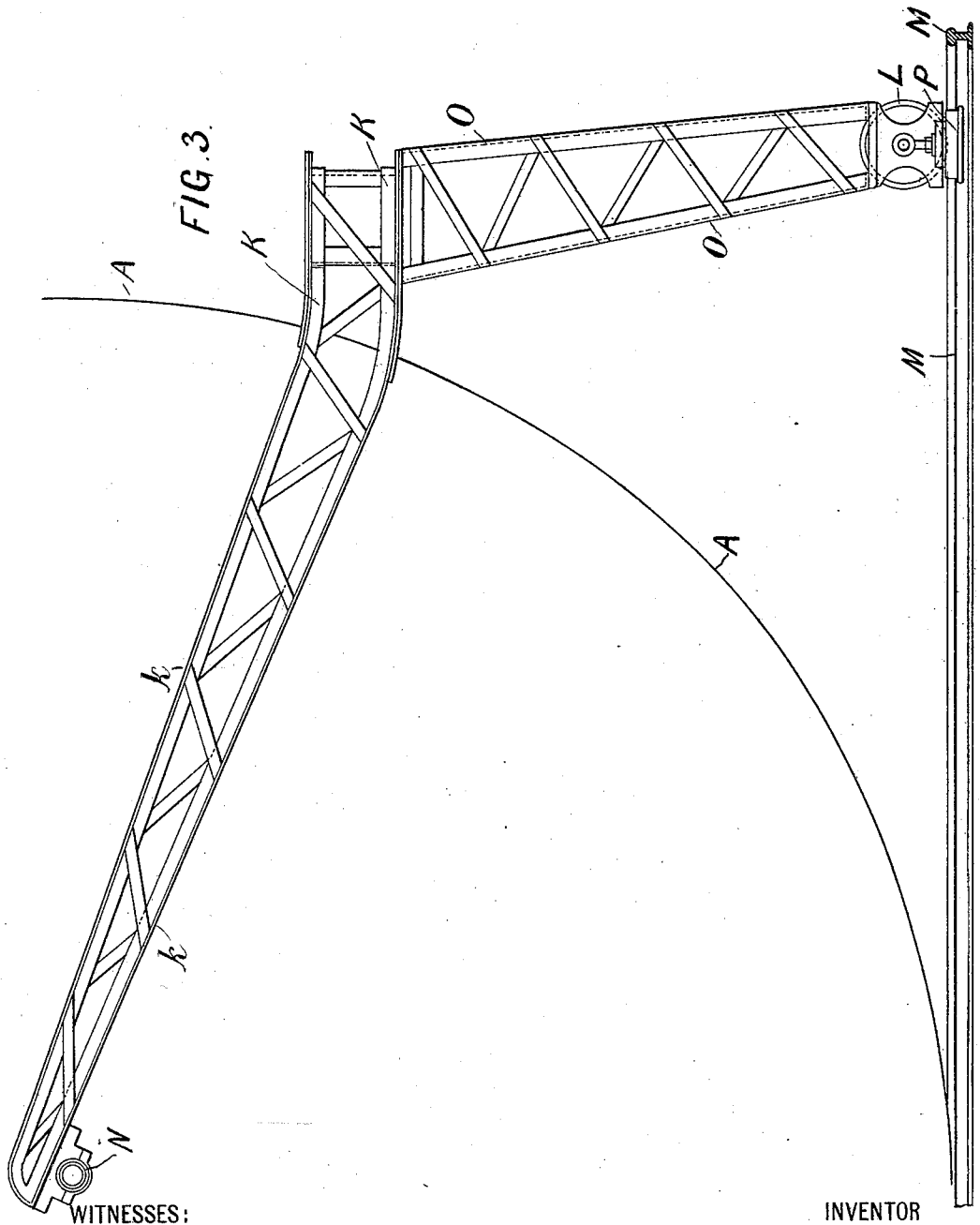

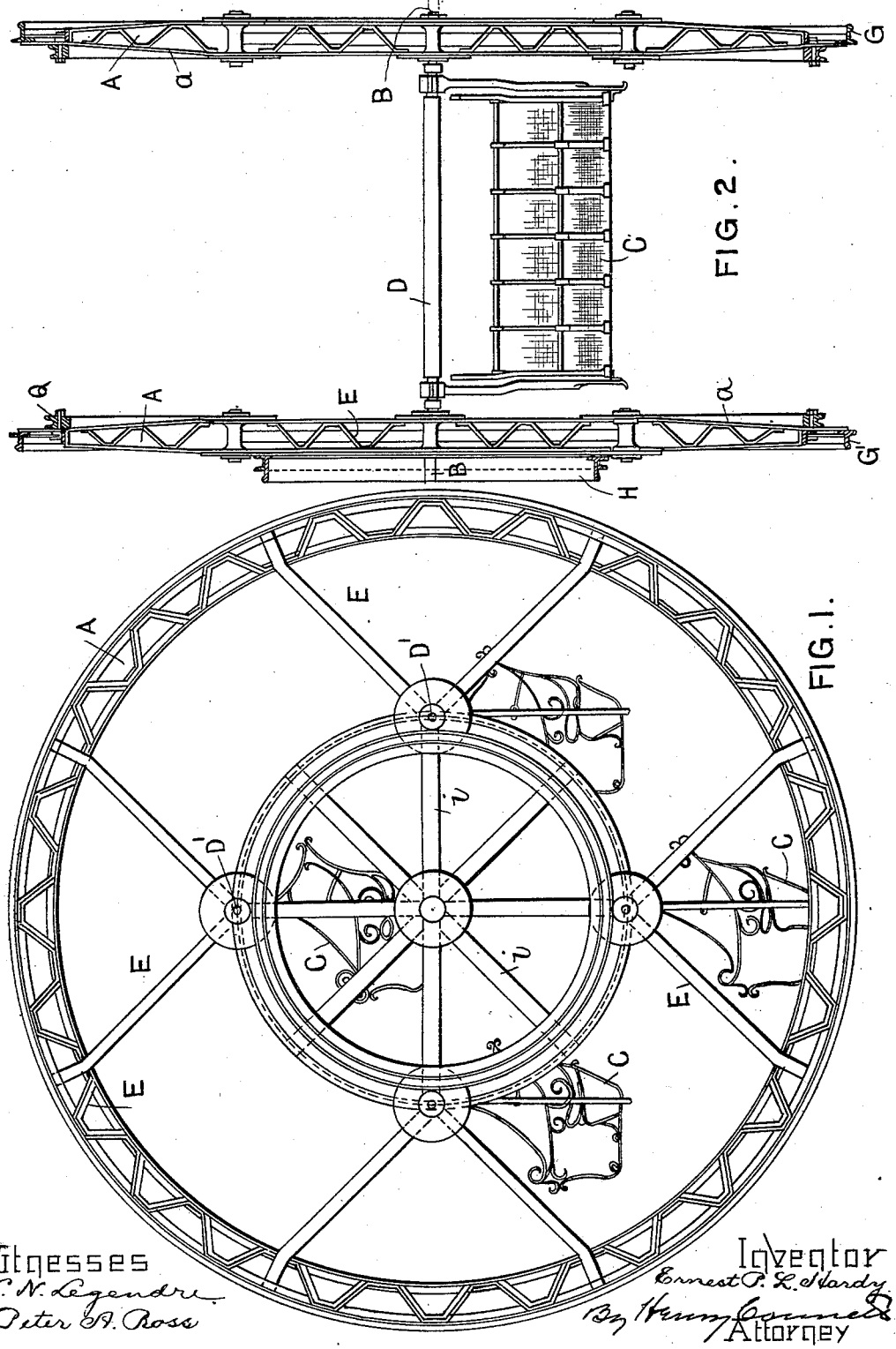

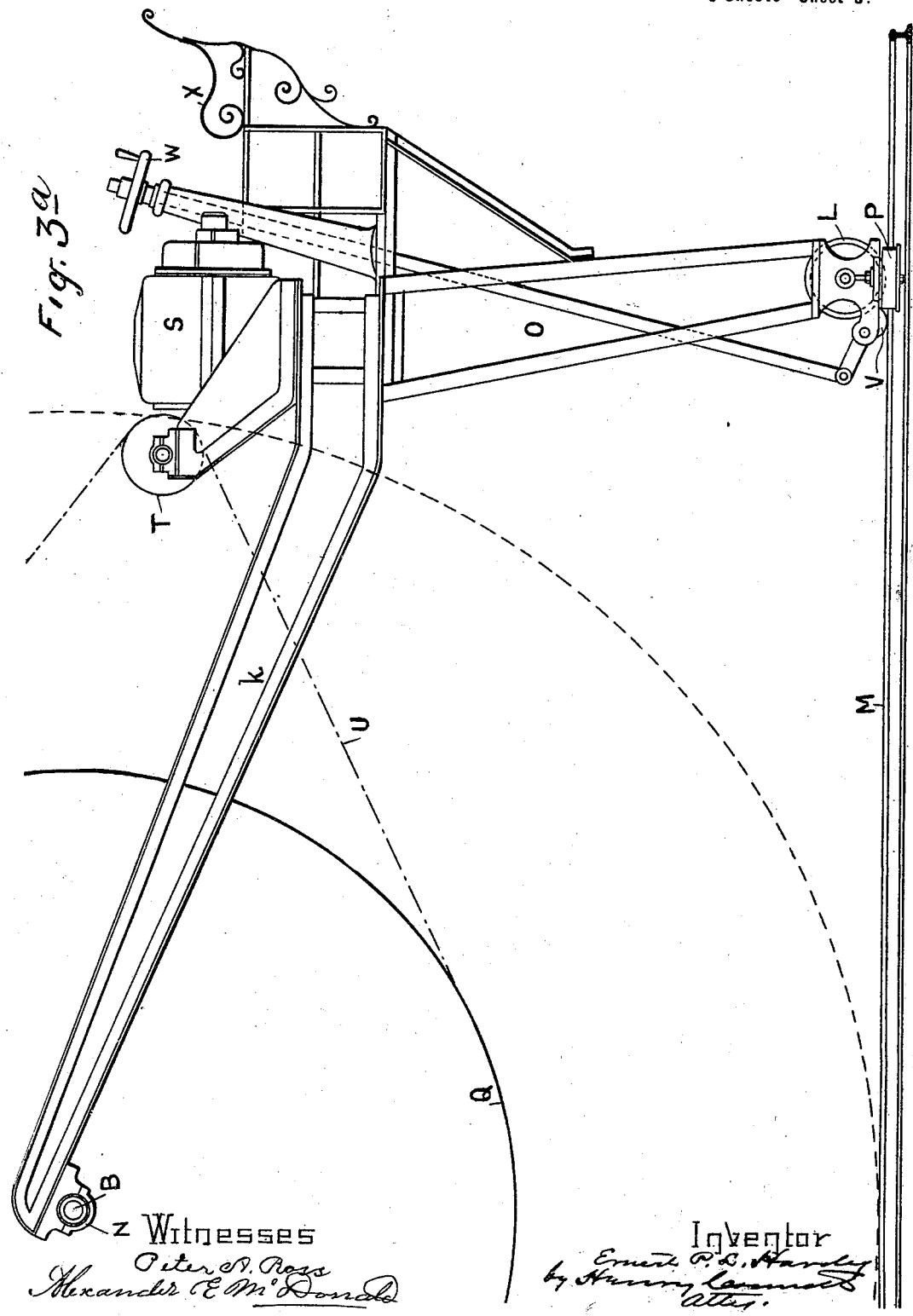

No. 673,206. Patented Apr. 30, 1901.
E. P. L. HARDY.
GRAVITATION OR GIGANTIC WHEEL FOR RECREATION PURPOSES.
(Application filed Dec. 12, 1899.)
(No Model.) 6 Sheets—Sheet 4.
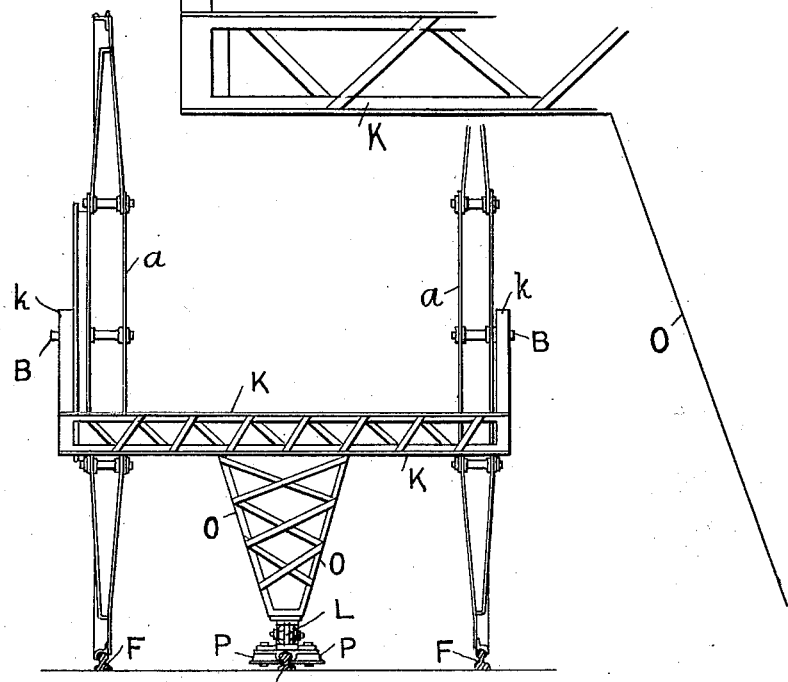
Witnesses
L. N. Legendre
Peter N. Ross
Inventor
Ernest P. L. Hardy
By Henry Connett
Attorney

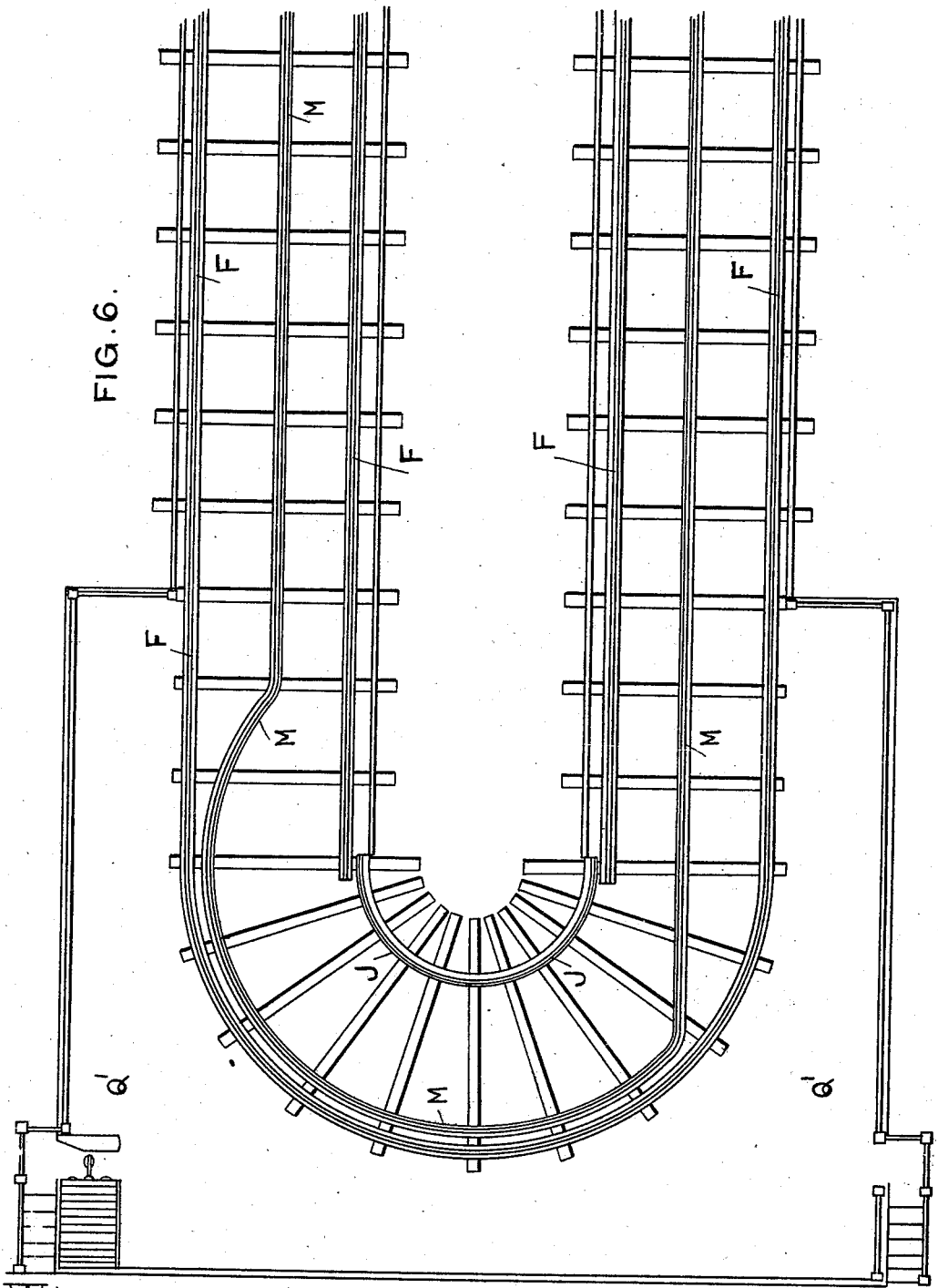

No. 673,206. Patented Apr. 30, 1901.
E. P. L. HARDY.
GRAVITATION OR GIGANTIC WHEEL FOR RECREATION PURPOSES.
(Application filed Dec. 12, 1899.)
(No Model.) 6 Sheets—Sheet 6.
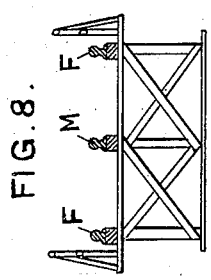
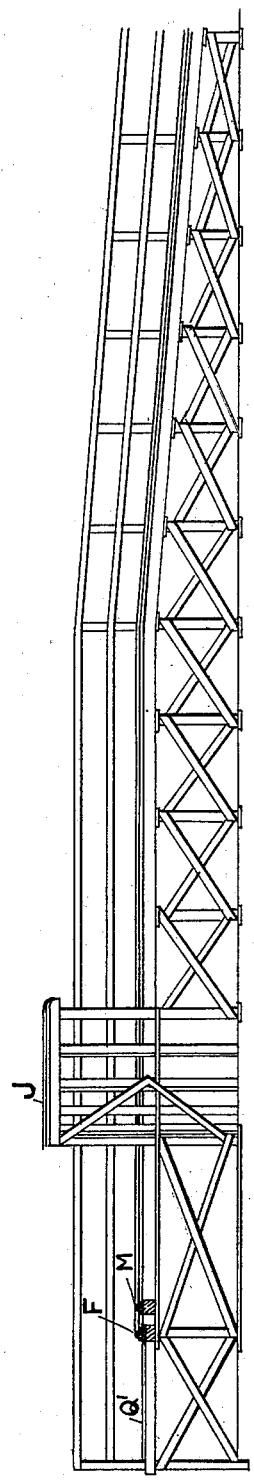
Witnesses
L. N. Legendre
Peter A. Ross
Inventor
Ernest P. L. Hardy
By Henry Connett
Attorney

UNITED STATES PATENT OFFICE.

ERNEST P. L. HARDY, OF LIVERPOOL, ENGLAND.

GRAVITATION OR GIGANTIC WHEEL FOR RECREATION PURPOSES.

SPECIFICATION forming part of Letters Patent No. 673,206, dated April 30, 1901.

Application filed December 12, 1899. Serial No. 740,066. (No model.)

*To all whom it may concern:*

Be it known that I, ERNEST PASQUALE LEONE HARDY, a subject of the King of Italy, residing in Liverpool, in the county of Lancaster, England, (whose post-office address is 51 South John street, Liverpool,) have invented certain new and useful Improvements in Gravitation or Gigantic Wheels for Recreation Purposes, of which the following is a specification.

This invention relates to gravitation or gigantic wheels for recreation purposes of that kind in which while the wheels rotate they travel along a permanent way composed of rails, and thus follow a cycloidal curve.

The present invention has for its object certain improvements in such wheels and in the arrangement of railway-tracks on which they travel and rotate.

The invention will be understood from the following description, reference being had to the accompanying drawings, in which—

Figure 1 is a side view of a gigantic or gravitation wheel; Fig. 2, an end view, showing one of the chariots and cross-bars; Fig. 3, a side view of the trailing carriage. Fig. 3ª is a view like Fig. 3, but showing an electric motor mounted on the trailing frame for driving the wheel; Fig. 4, an end view thereof; Fig. 5, an end view of both the wheel and the trailing carriage; Fig. 6, a plan of the track; Fig. 7, an elevation of the track; Fig. 8, a cross-section.

Referring to the figures, A is the big wheel, composed of a pair of wheels $a$, secured together by cross-bars D, passed through the holes D'. These wheels carry a suitable number of freely-suspended cars or chariots C for passengers, said cars depending from the cross-shafts D between the wheels $a$. The wheels are constructed of iron or steel, so braced and stayed by rods and bars E as to resist the weights and strains brought upon them. The wheel in addition to rotating is traveled backward and forward upon a railway F, which is arranged on gradients, like a switchback, or simply a downgrade followed by a corresponding up one, or on the level. The rims of the two wheels $a$ are arranged so as to run upon this railway F, being made with a pair of flanged tires G G' of a gage corresponding to that of the rails F. Then when the cars are loaded with passengers the big wheel is propelled onto the incline, down which it runs by gravitation, and up the ascending gradient on the other side, and it can proceed back on another line of rails to the point of departure, a curve being provided at the ends, around which the big wheel is respectively propelled onto the outward and return line. Thus as the wheel runs along the rails the cars are carried around and around in a vertical plane.

In order to enable the big wheel to travel easily around the curves and to prevent unnecessary friction, I fix on one side of the big wheel an auxiliary tire H of smaller diameter supported and braced by the stays $i$, and I stop off the inner rail of the track F at the curve and provide instead thereof an auxiliary rail J to take its place, which is arranged at some height above the horizontal plane of the other rails. It is arranged at such a height and in such a position as to receive the auxiliary tire H of the big wheel and enable it to roll thereon. The result is that the tire H of the wheel (that corresponding to the inner rail) is of much smaller diameter than the others and rolls on the raised track J, while the tire G on the other side of the wheel, which is of larger diameter, rolls on the outer rail of the main rail. If, therefore, the diameters of these two tires be carefully proportioned, the big wheel will turn in a given curve without any grinding or scraping, as would be the case if this arrangement were not provided. Throughout the remainder of the track the two rails F are horizontal in the plane of their cross-section, so that when the big wheel is running in a straight line the two peripheral tires G G' of the big wheel roll on the two rails; but at the curves the small tire H comes into play and supports the big wheel at inside of curve instead of the tire G', thus greatly facilitating the passage of the wheel around the curve and enabling it to turn a curve of very small radius.

At the rear of the big wheel I provide a trailing carriage K, the wheel L of which runs on the auxiliary rail M, placed midway between the main rails of the track. This trailing carriage is made with a jaw or pair of arms $k$, one on each side of and coupled to the trunnions B of the big wheel by means of the journal N. These trunnions project from the center of the wheel from the outside, but do not extend between the wheel, so that they form no obstruction to the travel of the cars. The arms $k$ are attached to and supported by the leg O, the end of which carries the wheel L, which runs on the center rail. In order to further steady the trailing carriage, this leg is fitted with side rollers or wheels P, which bear laterally against this auxiliary rail M. The object of this trailing carriage is to steady the big wheel and prevent its getting on the skew, which might be liable to throw it off the track. The trailing carriage being journaled to the trunnions of the big wheel and being steadied by the side rollers P keeps the big wheel steady both in traveling in a straight line and in going around the curves. The trailing carriage may be provided with an electric motor S, Fig. 3$^a$, receiving current from a conductor on the track or elsewhere, a grooved wheel T on a cross-shaft driven in the usual way from the shaft of the motor gearing by means of a chain or rope U or other gearing, with grooved rings or sprocket-wheels Q on the inside of the wheels. Should, therefore, the momentum of the wheel acquired on its downgrade not be sufficient to enable it to mount to the top of the upgrade, it is helped up to the extreme top by the motor S or by manual power or otherwise. The motor may also be used to act as a brake for controlling the speed of the big wheel on the downgrade, or a separate brake V may be provided, so as to stop the wheel at any required point. The brake V may be operated by a hand-wheel W from the driver's seat X. The middle rail M for the trailing carriage is so arranged at the curves as to facilitate the trailing carriage going around curves easily without any straining or unnecessary friction, while enabling it to always remain at right angles to the axis of the big wheel. For this purpose the center rail is by preference deflected toward the outside at the curves, as shown, so that its radius will be within a foot or two of the radius of the outer rail. Thus, for example, if the radius of the outer rail be nineteen feet six and the radius of the inner rail seven feet nine the radius of the center rail M will be, preferably, about eighteen feet, and this enables the carriage to always remain rigidly at right angles to the big-wheel axis.

At convenient positions, preferably at the curves, platforms Q' are provided to enable passengers when they disembark to step aside onto those platforms clear of the track. To load or unload therefore, the big wheel is brought to the curve of the track at the platform and the wheel turned around so that each car is brought in turn to the level of the track. The passengers from each car can thus get out in turn and other passengers embark in the chariots to replace them.

I declare that what I claim is—

1. The combination with a track having two main rails and an intermediate rail, of a gigantic wheel for recreation purposes mounted on said track, said wheel comprising a pair of large, connected wheels to run on said main rails, passenger-carrying cars or chariots suspended between said wheels, and a trailing carriage coupled to the trunnions of the large wheels and having a wheel which runs on said intermediate rail.

2. The combination with the track, having two main rails and an intermediate rail, of the two large, connected wheels running on said main rails, the suspended passenger-carrying cars, and the trailing carriage, coupled to the trunnions of the large wheels and provided with a wheel to run on said intermediate rail, and means on said carriage for embracing laterally the said intermediate rail, substantially as and for the purpose set forth.

3. The combination with the track, having two main rails and an intermediate rail, of the two large, connected wheels running on said main rails, the suspended passenger-carrying cars, and the trailing carriage, coupled to the trunnions of the large wheels and provided with a wheel to run on said intermediate rail, and wheels P, on said carriage and embracing said intermediate rail, substantially as and for the purpose set forth.

4. The combination with a gigantic wheel for recreation purposes, comprising two large, connected wheels, passenger-carrying cars suspended therein, and a trailing carriage provided with a wheel, of a curved track consisting of main rails F, for said large wheels, an inner, elevated rail J at the curve in the track, a tire H on one of the large wheels to roll on the rail J about the curve, and an intermediate rail M for the wheel of the trailing carriage to roll along, substantially as set forth.

5. The combination with a track comprising two main rails and an intermediate rail, and a gigantic wheel comprising two large, connected wheels to run on said main rails, the passenger-carrying cars suspended between said wheels, the trailing carriage, coupled to the trunnions of the large wheels, and a wheel on said trailing carriage to run on said intermediate rail, of a motor mounted on said trailing carriage and connected with one of said large wheels for driving, substantially as set forth.

6. The combination with the gigantic wheel for recreation purposes, provided with a trailing carriage and wheel thereon, and with a flanged tire H, of the curved track for said gigantic wheel, said track comprising two main rails, the outer rail being continuous about the curve and the inner rail broken away at the curve, the elevated, curved rail J at the said break in the inner rail, and adapted for the tire H to roll along, and the intermediate rail M, said rail being situated near the outer main rail about the curve, substantially as and for the purpose set forth.

In witness whereof I have hereunto signed my name, this 13th day of November, 1899, in the presence of two subscribing witnesses.

E. P. L. HARDY.

Witnesses:
ALBERT C. B. HENRI,
H. P. SHOOBRIDGE.